March 27, 1945. G. H. ABEEL, 3D 2,372,350
VARIABLE LENGTH PROPELLER
Filed July 27, 1942
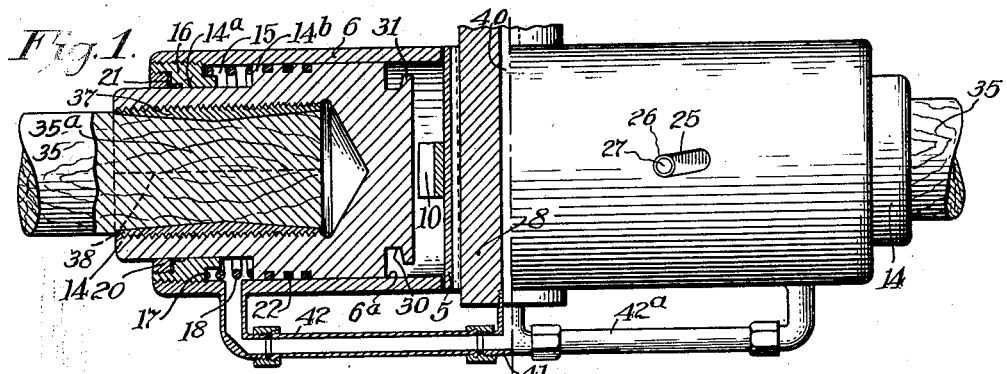
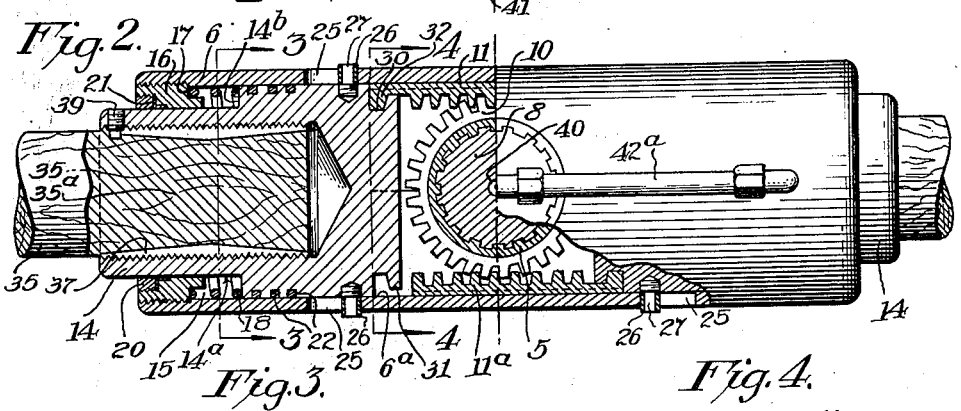
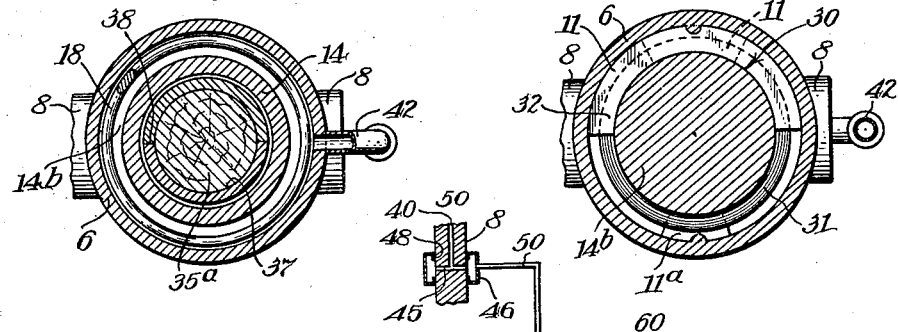
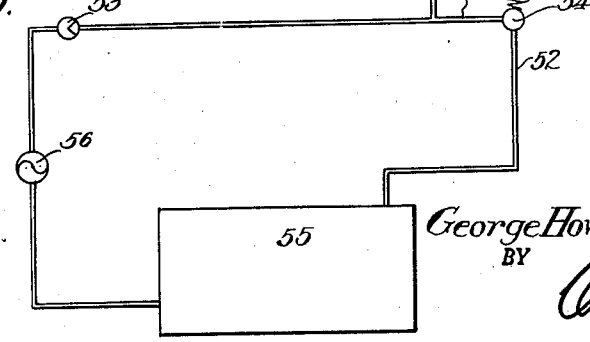
INVENTOR.
George Howard Abeel III,
BY
Attorney Patented Mar. 27, 1945

2,372,350

UNITED STATES PATENT OFFICE 2,372,350

VARIABLE LENGTH PROPELLER

George Howard Abeel, III, North Hollywood, Calif., assignor of one-third to C. Bland Jamison and one-third to Collins Mason, both of Beverly Hills, Calif.

Application July 27, 1942, Serial No. 452,438

3 Claims. (Cl. 170—160)

My invention relates to propellers and it is among the more particular objects to provide an airplane propeller the effective length of the blades of which is variable by hydraulically operated means.

Another object is the provision of an airplane propeller in which the pitch angle of the blades is variable by hydraulically operated means.

Another object is the provision of an airplane propeller of the constant speed type embodying a simple and effective hydraulic system and means for varying the diameter and pitch of the propeller in accordance with the speed of the motor employed to operate the propeller.

Additional objects and accomplishments are inherent in my invention and how those as well as the objects hereinabove specified are achieved will become apparent to those skilled in this art from the following detailed description of one of the specific forms in which the invention may be carried out, for which purpose I shall refer to the accompanying drawing, in which:

Fig. 1 is a top plan view, partly in longitudinal section;

Fig. 2 is a front view partly in longitudinal section;

Fig. 3 is a cross-section on line 3—3 of Fig. 2;

Fig. 4 is a cross-section on line 4—4 of Fig. 2; and

Fig. 5 is a diagrammatic view showing the hydraulic fluid system.

In the drawing, I show a hub element consisting of a spindle 5 and a radial barrel 6, the barrel having a longitudinal bore 6a and the spindle being splined onto the motor drive shaft 8. A pinion gear 10 is rotatably mounted on the spindle within the barrel and has teeth which mesh with corresponding teeth on oppositely disposed rack members 11, 11a for purposes of equalizing movement of the blades.

A pair of ferrules 14 are slidably and rotatably mounted one in each end of the barrel and each has an annular reduced diameter portion 14a to provide space between it and the inner wall of the barrel adjacent each end of the latter an annular fluid chamber 15 and to provide an annular plunger portion 14b. Chamber 15 is adapted to contain a substantially non-compressible hydraulic fluid of a type well-known in the art. A plug ring 16 is screwed into each end of the barrel and each has a shoulder 17 providing a seat for one end of a compression spring 18, the other end of the spring bearing against the plunger portion 14b of the ferrule for the purpose to be described. A seal ring 20 is threaded into the outer end of each plug ring 16, a flange packing ring 21 being interposed between the rings 16 and 20 to provide a fluid-tight seal. Steel or other suitable hydraulic seal rings 22 are mounted in annular recesses in the ferrule to provide a fluid-tight seal between the ferrule and barrel interior.

At each side of the spindle the barrel is provided with a diagonal slot 25 disposed in a direction longitudinally and circumferentially of the barrel, along each of which slots a roller 26, carried by a screw 27, rolls as the propeller moves longitudinally of the barrel as will be hereinafter explained, each screw 27 being threaded into the adjacent ferrule 14.

The inner end of each ferrule is provided with an annular groove 30 and an annular flange 31 into which respective grooves the flanged end 32 of the respective rack members 11 fit in such manner that the ferrule may rotate with respect to its rack, the flanges 31 preventing longitudinal movement of the ferrules with respect to the racks.

Within each ferrule I mount the shank 35a of a blade 35, the blade and shank being here shown as non-metallic but of course it will be understood that metal blades may be employed. Each blade shank 35a is embraced by a sleeve 37 longitudinally split at diametrically opposite sides 38 to render the sleeve in the form of separable segments to facilitate assembly. The shank 35a tapers from each end to a reduced diameter medial portion and the sleeve is correspondingly tapered to conform to the taper of the shank whereby to prevent the blade from being pulled longitudinally from the barrel. This blade mounting structure is of the type more particularly shown in the copending application of James E. Carol, Serial Number 395,398, filed May 27, 1941. Each sleeve 37 is threaded into its ferrule, a lock screw 39 being provided therethrough to lock the ferrule, sleeve and shank against relative rotation except when the screws are moved for tightening or adjustment purposes.

In operation, as the speed of the operating motor increases, the resultant increased centrifugal force longitudinally of the propeller blades 35 urges the shanks outwardly of the barrel against the fluid maintained in the chambers 15, the outward movement simultaneously effecting both an increase in diameter of the propeller as well as an increase in the pitch angle of the blades, the latter being effected by means of the rollers 26 traveling along the diagonal slots 25 provided in the barrel.

For passing hydraulic fluid to and from chambers 15, I provide a bore 40 longitudinally in the drive shaft 8, in the outer end of which bore a T 41 is mounted, the legs of the T being communicatively connected by tubes 42, 42a with the respective chambers 15.

My system of effecting and controlling the flow of hydraulic fluid to and from the chambers 15 will now be described. As best shown diagrammatically in Fig. 5, I provide radial passageways 45 through the drive shaft communicating with the bore 40, which passageways communicate at their outer ends with a hollow collar 46 around the shaft and within which the shaft is rotatable, suitable fluid seal packings 48 being interposed between the collar and shaft. A fluid line 50 communicates at one end with collar 46, line 50 communicating at its other end with a continuous fluid line 52 at a point between a check valve 53 and an adjustable relief valve 54, both said valves being of well-known construction. From relief valve 54 line 52 communicates with a sump 55 and thence with a pump 56. Pump 56 may be driven by means independent of the airplane motor or may be driven by the airplane motor through a gear train of suitable ratio to cause the pump to operate at a speed to provide the desired differential in pressures exerted on the fluid by the pump and centrifugal forces. The pump 56 is operated to constantly urge movement of fluid towards the chambers 15, but of course the pumped fluid cannot pass the check valve 53 until the back pressure caused by centrifugal force tending to move the blades outwardly from the barrels drops below the pump pressure, the check valve 53 seating towards the pump and being interposed between the pump and the point at which tube 50 communicates with line 52.

Operation of the device is as follows: As the centrifugal force tends to throw the blade shanks 35a outward of the barrel, the ferrules 14, acting as pistons, increase the pressure on the hydraulic fluid in the chambers 15 above that exerted by pump 56. Relief valve 54 is set to relieve this pressure at any predetermined stage by permitting fluid to flow from the chambers into the sump 55. As the speed of the propeller is decreased by decreased R. P. M. of the airplane motor to below the pressure exerted by the pump 56, the pump acts to return fluid to the chambers 15 to move the ferrules and their carried blade shanks inwardly of the hub to diminish the diameter or effective length of the blades as well as diminish the pitch angle of the blades. Thus it is possible by use of my propeller to vary the diameter and pitch of the propeller in consonance with the speed of the airplane motor and it is also possible to so adjust the hydraulic system as to predetermine the airplane motor speed at which the variations in diameter and pitch will take place, by adjusting the relief valve 54.

Since it is usually desirable to maintain the propeller at minimum diameter and pitch during take-off of the airplane, I provide an operative connection 60 to the relief valve which leads to the cockpit of the airplane (not shown) to enable the pilot to increase the tension on the valve spring 61 at will and thus prevent escape of the hydraulic fluid from the chambers 15 and resultant outward movement of the blades, until the pilot desires that it take place.

Springs 18, there being one disposed in each chamber 15, function merely to retain the propeller in normal position while the airplane motor is not being operated.

It is universally recognized that it is highly desirable to obtain variations in diameter as well as pitch of airplane propellers during operation, but so far as I am aware no one heretofore has accomplished those ends, or either of them so simply and efficiently as is achieved by my invention, and while I have resorted to considerable detail in describing one specific form of apparatus in which my invention may be carried out, I wish it understood that the invention, in its broader scope, is not confined to those details since it may be carried out in apparatus taking other specific forms and associations of parts.

I claim:

1. A propeller of the class described comprising, in combination with an airplane motor having a drive shaft, a hub secured on the drive shaft, a propeller blade longitudinally slidably mounted in the hub, plunger means carried by the blade, said plunger means being operable to force fluid from the chamber in response to centrifugal force exerted on the blade, a continuous hydraulic fluid line including at points spaced apart therealong a relief valve and a check valve seating away from the relief valve, a fluid pump, means for operating the pump, and a fluid passing tube providing communication between the chamber and said fluid line at a point between the relief valve and the check valve, said relief valve functioning to controllably release fluid from the chamber upon movement of the plunger in one direction and said pump being operable to force fluid through the check valve into the chamber to cause movement of the plunger in the opposite direction.

2. A variable length propeller comprising, in combination, a hub having a radially disposed cylindrical portion, a blade having a shank reciprocally mounted in said hub portion and being movable longitudinally outwardly thereof by virtue of centrifugal force, hydraulic means so operatively associated with the shank as to move it longitudinally inwardly of the hub portion against said centrifugal force, and a compression spring interposed between the shank and hub portion whereby to urge the shank inwardly of the hub portion independently of the hydraulic means.

3. A variable length propeller comprising, in combination, a hub having a radially disposed cylindrical portion, a piston reciprocally mounted in said cylindrical portion, a longitudinal bore in the piston, a blade having a shank portion secured in the bore, a ring secured in the outer end of the cylindrical portion of the hub, said ring defining with the piston a pressure chamber, and hydraulic means operatively associated with the chamber whereby to move the piston and its carried shank longitudinally of said hub portion.

GEORGE HOWARD ABEEL, III.